(12) United States Patent  
Charest et al.

(10) Patent No.: US 6,334,591 B2  
(45) Date of Patent: *__Jan. 1, 2002__

(54) BASKET FOR SUSPENSION FROM OVERHEAD CABLES

(75) Inventors: Marc Charest, Brossard; Christian Carpentier, St. Barthelemy, both of (CA)

(73) Assignee: Les Hélicoptéres Canadiens Limitée, Les Dédres (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,206

(22) Filed: Apr. 2, 2001

Related U.S. Application Data

(63) Continuation of application No. 09/369,284, filed on Aug. 6, 1999, now Pat. No. 6,234,424.

(51) Int. Cl.[7] .............................. B64C 1/22; B64C 1/20; B64D 1/08; B64D 9/00; B64D 47/00
(52) U.S. Cl. ................................. 244/137.2; 244/118.1; 244/137.1
(58) Field of Search ........................... 244/118.1, 118.5, 244/118.6, 137.1, 137.2, 137.4

(56) References Cited

U.S. PATENT DOCUMENTS

| | | | | |
|---|---|---|---|---|
| 3,702,124 A | * | 11/1972 | Highland | 182/14 |
| 4,113,207 A | * | 9/1978 | Dalziel | 244/137.2 |
| 4,188,000 A | * | 2/1980 | Dalziel | 244/137.2 |
| 4,473,011 A | * | 9/1984 | Wuschek | 104/173.1 |
| 4,564,161 A | * | 1/1986 | Frye | 244/137.2 |
| 5,020,742 A | * | 6/1991 | Haslim | 244/137.2 |
| 5,273,239 A | * | 12/1993 | De Parny et al. | 244/118.1 |
| 5,328,133 A | * | 7/1994 | Charest et al. | 244/118.1 |

FOREIGN PATENT DOCUMENTS

| | | |
|---|---|---|
| CA | 2055639 | 5/1992 |

* cited by examiner

*Primary Examiner*—Charles T. Jordan
*Assistant Examiner*—Christian M. Best
(74) *Attorney, Agent, or Firm*—Swabey Ogilvy Renault; Michael Sofia

(57) ABSTRACT

A basket for supporting equipment between a pair of laterally spaced-apart parallel overhead cables. The basket is provided in the form of a top open container insertable between the overhead cables. A carrying member engageable with a helicopter arm is provided for allowing the basket to be selectively transported between and away from the overhead cables. A pair of wing-like members extend laterally outwardly from opposed side walls of the container for resting on the overhead cables once the basket has been lowered to a suspended position between the overhead cables.

12 Claims, 1 Drawing Sheet

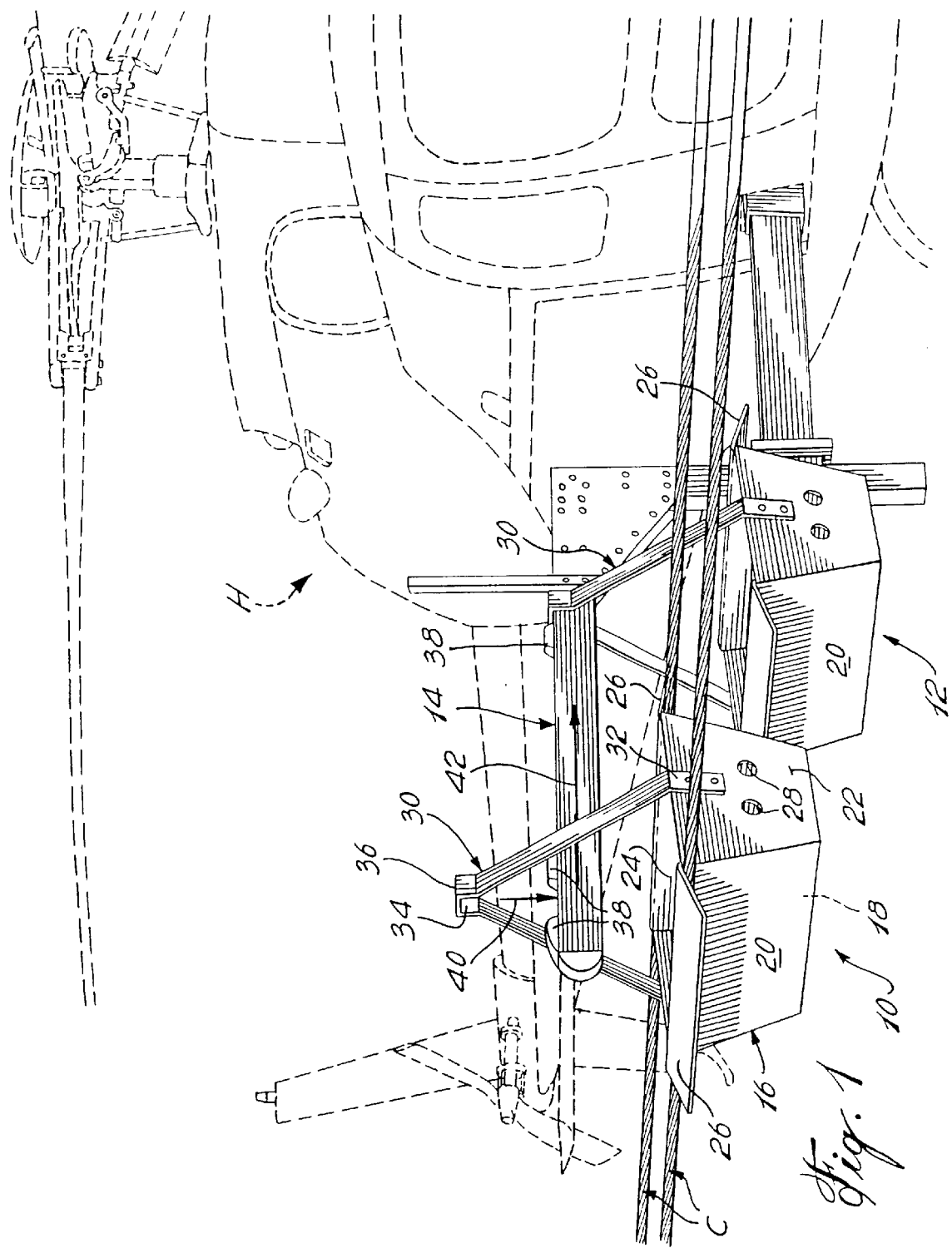

BASKET FOR SUSPENSION FROM OVERHEAD CABLES

This is a Continuation of U.S. patent application Ser. No. 09/369,284 filed on Aug. 6, 1999, now U.S. Pat. No. 6,234,424.

BACKGROUND OF THE INVENTION

1. Field of the Invention

The present invention relates to containers and, more particularly, to containers adapted to be suspended from overhead cables, such as high voltage lines.

2. Description of the Prior Art

It is well known that overhead cables, such as high tension lines or cables used to support cabins of a telpher, must be periodically inspected and sometimes repaired. Accordingly, various nacelles and buckets have been developed for supporting equipment or operators on overhead or elevated cables, such as high tension lines.

For instance U.S. Pat. No. 5,328,133 issued on Jul. 12, 1994 to Charest et al. discloses a nacelle removably mounted at one end of a support extending laterally outwardly from a helicopter. The nacelle is provided on either sides thereof with suspension wheels which can be pivoted inwardly to ride on a pair of overhead cables once the nacelle has been properly positioned thereunder by means of the helicopter.

Canadian Patent laid-open application No. 2,055,639 filed on Nov. 15, 1991 in the names of De Forges de Parny et al., discloses a nacelle adapted to be positioned between a pair of overhead cables. The nacelle is provided on either side thereof with support members defining respective inverted channels adapted to receive a subjacent length of cable when the nacelle is lowered to a suspended position between the cables by means of a helicopter to which the nacelle is attached via a plurality of rope slings depending downwardly from the helicopter.

Although the nacelles described in the above-mentioned patents are effective for supporting operators on elevated high voltage lines, it has been found that there is a need for a simpler basket construction which is specifically designed for supporting equipment between a pair of overhead cables.

SUMMARY OF THE INVENTION

It is therefore an aim of the present invention to provide a helicopter carried basket to be placed and suspended between a pair of laterally spaced-apart elevated cables;

It is also an aim of the present invention to provide such a basket which is relatively simple and economical to manufacture.

It is a further aim of the present invention to provide such a basket which can be easily installed in position between the cables and removed therefrom when required.

Therefore, in accordance with the present invention, there is provided a basket for supporting equipment between a pair of laterally spaced-apart parallel overhead cables, comprising a main body defining a receiving cavity and being sized to be insertable between the overhead cables, carrying means releasably engageable with a helicopter arm for allowing the basket to be selectively transported to and away from the overhead cables, and at least one hanger extending laterally outwardly from the main body for resting on subjacent portions of both overhead cables once the main body has been lowered to a suspended position between the overhead cables.

According to a further general aspect of the present invention, there is provided a basket for supporting equipment between a pair of laterally spaced-apart parallel overhead cables in combination with a support arm extending laterally outwardly from a helicopter. The basket comprises a main body defining a receiving cavity and being adapted to be inserted between the overhead cables, a carrying member by which the main body is portable by the support arm for allowing the basket to be selectively positioned between the overhead cables and removed therefrom via operation of the helicopter, and at least one hanger extending laterally outwardly from the main body for engagement with both overhead cables to rest thereon once the main body has been positioned between the overhead cables, thereby allowing the basket to be held in an upright suspended position between the overhead cables.

BRIEF DESCRIPTION OF THE DRAWINGS

Having thus generally described the nature of the invention, reference will now be made to the accompanying drawing, showing by way of illustration a preferred embodiment thereof, and in which:

FIG. 1 is a perspective view of a pair of baskets in accordance with a first embodiment of the present invention, illustrating how the baskets are installed between a pair of laterally spaced-apart overhead cables by a helicopter.

DESCRIPTION OF THE PREFERRED EMBODIMENTS

Now referring to FIG. 1, there is shown a pair of baskets 10 and 12 adapted to be detachably suspended from a support arm 14 extending laterally outwardly from one side of a helicopter H used to transport the baskets 10 and 12 between and away from a pair of laterally spaced-apart parallel overhead cables C, such as high voltage lines, supported at intervals by spaced-apart cable support structures, such as towers (not shown).

The baskets 10 and 12 are of similar construction and, thus, only the structural features of basket 10 will be herein described.

As seen in FIG. 1, basket 10 is provided in the form of an open top container having a main body 16 including a bottom wall 18 from the periphery of which a pair of parallel side walls 20 and a pair of parallel end walls 22 project upwardly to define a receiving cavity 24 adapted to contain equipment which can be subsequently used, for instance, to inspect, maintain and/or repair the overhead cables C. The side walls 20 are fixed along opposed side edges thereof to corresponding side edges of adjacent end walls 22. The end walls 22 taper from top to bottom and, thus, the side walls 20 each define an obtuse angle with the bottom wall 18, whereby the width of the basket 10 gradually decreases from top to bottom. This structural characteristic of the basket 10 facilitates the insertion thereof between the overhead cables C, as will be explained in more details hereinafter. It is understood that the distance separating the overhead cables C is known and that the basket 10 is designed so that the maximum width thereof be slightly less than the above mentioned distance.

A wing-like member 26 extends laterally outwardly from each side wall 20 of the basket 10. The wing-like members 26 are slightly inclined downwardly and act as hangers to allow the basket 10 to be suspended from the spaced-apart overhead cables C. According to the illustrated embodiment, the wing-like members 26 are integral to respective side walls 20 and extend laterally outwardly therefrom as a lateral extension of the top borders of the side walls 20. Alternatively, each wing-like member 26 could be provided in the form of a distinct L-shaped panel having a first portion adapted to be superposed and secured on the upper portion of the inner surface of one of the side wall 20 with the second portion of the L-shaped panel extending over and outwardly past the upper edge of the side wall 20.

According to a preferred construction of the present invention, the basket 10 is formed of a single rectangular sheet of material cut and subsequently folded in a box-like configuration. More specifically, the sheet is first cut along four diagonal lines extending from the corners of the sheet to respective corners of a predetermined rectangular central portion of the sheet which will subsequently form the bottom wall 18 of the basket 10. Once the sheet has been properly cut, the four interconnected panels are folded along the imaginary lines joining the corners of the predetermined rectangular central portion of the sheet so as to form the side walls 20 and the end walls 22 of the basket 10. Then, adjacent side walls 20 and end walls 22 are welded or otherwise secured together. The wing-like members 26 are formed by folding over outwardly respective top portions of the side walls 20 along a folding line extending generally in a plane containing the top edges of the end walls 22 when folded in a box-like configuration. It may be convenient to carry out this operation prior to folding the interconnected panels in a box-like configuration.

The basket 10 can be made of aluminum or other suitable conductive or semi-conductive materials exhibiting sufficient structural rigidity.

As seen in FIG. 1, holes 28 may be defined, for instance, in the end walls 22 of the basket 10 for reducing the overall weight thereof as well as the resistance of the wind during the transportation of the basket 10 by the helicopter H.

The basket 10 may be suspended from the support arm 14 of the helicopter H by means of a carrying member 30 secured at lower ends 32 thereof to respective opposed end walls 22. The carrying member 30 is made of a rigid material and has a generally inverted V-shaped configuration. A channel 34 extending in a direction parallel to the top and bottom edges of the end walls 22 and having a square or rectangular cross-section is defined at an apex 36 of the inverted V-shaped carrying member 30. The channel 34 is open towards the bottom so that the carrying member 30 may be suspended in a stable manner on the support arm 14 with the inner surface of the channel 34 embracing the top and sides of the support arm 14, thereby preventing rotational movement of the basket 10 about the support arm 14. Linear movement of the basket 10 along the support arm 14 is prevented by the provision of a pair of abutment members 38 disposed at longitudinally spaced-apart locations on the top surface of the support arm 14 to receive therebetween the apex 36 of the carrying member 30. As seen in FIG. 1, additional pairs of abutment members 38 may be provided along the length of the support member 14 to allow more than one basket to be carried at the same time.

In operation, the equipment to be suspended to the overhead cables C is loaded into the baskets 10 and 12 and the same are suspended from the support arm 14 between respective pairs of abutment members 38. The baskets 10 and 12 are then transported above a length of overhead cables C where an operation, such as repair, has to be performed. When, the helicopter H approaches the overhead cables C and hovers laterally adjacent thereto with the basket 10 aligned over the area between the overhead cables C so that the bottom edges of the side walls 20 thereof are substantially parallel to the overhead cables C, the basket 10 is lowered by the helicopter H between the overhead cables C so as to seat the wing-like members 26 against subjacent length of cables. This operation is greatly facilitated by the fact that the side walls 20 flare outwardly from bottom to top, thereby acting as a guide during the lowering of the basket 10 between the overhead cables C. Once the wing-like members 28 properly rest on the overhead cables C with the same frictionally contacting the upper portion of adjacent side walls 20, the support arm 14 is lowered by the helicopter H, as depicted by arrow 40 in FIG. 1, so as to move the support arm 14 out of engagement with the carrying member 30. Then, the helicopter H moves sideways to withdraw the support arm 14 from between the inverted V-shaped carrying member 30, as indicated by arrow 42. The wing-like members 26 uniformly bear on the overhead cables C to support the main body 16 of the basket 10 in an upright suspended position between the overhead cables C.

It is noted that the downward inclination of the wing-like members 26 ensures stability of the basket 10 on the overhead cables C. Furthermore, the configuration of the wing-like members 26 advantageously facilitate the installation of the basket 10.

The second basket 12 can then be installed at an appropriate location as per the way described hereinbefore with respect to basket 10.

When, it is desired to remove the baskets 10 and 12 from between the overhead cables C, the helicopter is operated so as to insert the support arm 14 sideways between respective carrying members 30 of the baskets 10 and 12 and thereafter displace the same upwardly in engagement within respective channels 34. When the two baskets 10 and 12 have been successively suspended in position from the support arm 14, the helicopter H hovers away from the cables C to transport the baskets 10 and 12 at ground level.

The above described equipment carrying system provides a simple, practical and economical manner of supporting equipment between a pair of overhead cables C, such as high voltage lines.

What is claimed is:

1. A basket transportable by a helicopter arm for supporting equipment between a pair of laterally spaced-apart parallel overhead cables, comprising a main body defining a receiving cavity and being sized to be insertable between the overhead cables, a carrier adapted to be releasably and non-rotatably engaged with a helicopter arm for allowing said basket to be selectively transported to and away from the overhead cables, said carrier including a carrying member by which said main body may be suspended from the helicopter arm, said carrying member extending over said receiving cavity and defining an inverted channel adapted to be axially engaged on the helicopter arm, said carrying member being made of a substantially rigid material, and at least one hanger extending laterally outwardly from said main body for resting on subjacent portions of both overhead cables once said main body has been lowered to a suspended position between the overhead cables.

2. A basket as defined in claim 1, wherein a pair of hangers extend laterally outwardly from opposed side walls of the main body to uniformly support the same on the overhead cables.

3. A basket as defined in claim 2, wherein said main body includes an upper edge circumscribing an opening leading to said receiving cavity, and wherein said hangers extend laterally outwardly from said upper edge.

4. A basket as defined in claim 3, wherein said hangers are integrally formed with said main body.

5. A basket as defined in claim 4, wherein each of said hangers consists of an extension of an associated one of said side walls of said main body, said extension being folded over outwardly at said upper edge to form a pair of wing-like structures adapted to rest against said overhead cables.

6. A basket as defined in claim 2, wherein said hangers are inclined downwardly.

7. A basket as defined in claim 1, wherein said main body has an outer surface which tapers from a top portion to a bottom portion of said main body.

8. A basket as defined in claim 1, wherein said main body is perforated.

9. A basket as defined in claim 2, wherein said main body includes a pair of opposed end walls extending between said opposed side walls, and wherein said carrying member is secured at opposed end portions thereof to respective opposed end walls of said main body.

10. A basket as defined in claim 9, wherein said carrying member has a generally inverted V-shaped configuration, and wherein said inverted channel is defined at an apex of said carrying member.

11. A basket transportable by a helicopter arm for supporting equipment between a pair of laterally spaced-apart parallel overhead cables, comprising a main body defining a receiving cavity and being sized to be insertable between the overhead cables, a carrier adapted to be releasably and non-rotatably engaged with a helicopter arm for allowing said basket to be selectively transported to and away from the overhead cables, and at least one hanger extending laterally outwardly from said main body for resting on subjacent portions of both overhead cables once said main body has been lowered to a suspended position between the overhead cables, wherein said main body has an outer surface which tapers from a top portion to a bottom portion of said main body.

12. A basket transportable by a helicopter arm for supporting equipment between a pair of laterally spaced-apart parallel overhead cables, comprising a main body defining a receiving cavity and being sized to be insertable between the overhead cables, a carrier adapted to be releasably and non-rotatably engaged with a helicopter arm for allowing said basket to be selectively transported to and away from the overhead cables, and at least one hanger extending laterally outwardly from said main body for resting on subjacent portions of both overhead cables once said main body has been lowered to a suspended position between the overhead cables, wherein each of said hangers consists of an extension of an associated one of said side walls of said main body, said extension being folded over outwardly at said upper edge to form a pair of wing-like structures adapted to rest against said overhead cables.

* * * * *